United States Patent
Baker et al.

(10) Patent No.: US 11,466,905 B2
(45) Date of Patent: *Oct. 11, 2022

(54) AIR-COOLED AMMONIA REFRIGERATION SYSTEMS AND METHODS

(71) Applicant: Walmart Apollo, LLC, Bentonville, AR (US)

(72) Inventors: Steven Kent Baker, Bentonville, AR (US); Marcos Rente Braz, Azle, TX (US)

(73) Assignee: Walmart Apollo, LLC, Bentonville, AR (US)

(*) Notice: Subject to any disclaimer, the term of this patent is extended or adjusted under 35 U.S.C. 154(b) by 156 days.

This patent is subject to a terminal disclaimer.

(21) Appl. No.: 16/858,835

(22) Filed: Apr. 27, 2020

(65) Prior Publication Data

US 2020/0256591 A1 Aug. 13, 2020

Related U.S. Application Data

(63) Continuation of application No. 15/649,742, filed on Jul. 14, 2017, now Pat. No. 10,670,307.

(Continued)

(51) Int. Cl.
*F25B 15/04* (2006.01)
*F25B 15/00* (2006.01)
(Continued)

(52) U.S. Cl.
CPC ............ *F25B 15/04* (2013.01); *F25B 15/008* (2013.01); *F25B 15/025* (2013.01); *F25B 37/00* (2013.01); *Y02A 30/27* (2018.01); *Y02B 30/62* (2013.01)

(58) Field of Classification Search
CPC ...... F25B 15/04; F25B 15/008; F25B 15/025; F25B 37/00; F25B 39/00; F25B 39/02;
(Continued)

(56) References Cited

U.S. PATENT DOCUMENTS

| 2,233,633 | A | 3/1941 | Mollenberg |
| 2,401,918 | A | 6/1946 | Elder |

(Continued)

FOREIGN PATENT DOCUMENTS

| CN | 1493826 A | * | 5/2004 |
| CN | 1493826 A | * | 5/2004 |

(Continued)

OTHER PUBLICATIONS

Evapco, Inc.; "Evapco Parallel Hybrid Condensers"; 2013; pp. 24.

(Continued)

*Primary Examiner* — Emmanuel E Duke
(74) *Attorney, Agent, or Firm* — Fitch, Even, Tabin & Flannery LLP

(57) ABSTRACT

In some embodiments, an air-cooled ammonia refrigeration system comprises: an air-cooled condenser comprising a heat exchanger and at least one axial fan; an evaporator coupled to the air-cooled condenser; a subcooler positioned between the air-cooled condenser and the evaporator; a compressor coupled to the evaporator; an oil cooler coupled to the compressor; a water system coupled to the air-cooled condenser, the water system comprising a water source, a water pump, and a plurality of spray nozzles positioned below the air-cooled condenser; and a control circuit coupled to the air-cooled condenser and the water system, the control circuit configured to pulse atomized water through the plurality of spray nozzles to a surface of the air-cooled condenser when a head pressure of the air-cooled condenser is higher than a predetermined value.

20 Claims, 7 Drawing Sheets

Related U.S. Application Data

(60) Provisional application No. 62/363,151, filed on Jul. 15, 2016.

(51) Int. Cl.
*F25B 15/02* (2006.01)
*F25B 37/00* (2006.01)

(58) Field of Classification Search
CPC ............... F25B 39/04; F25B 2339/046; F25B 2339/047; Y02A 30/27; Y02B 30/62; F28D 5/00; F28D 5/02; F24F 1/56
See application file for complete search history.

(56) References Cited

U.S. PATENT DOCUMENTS

| | | | |
|---|---|---|---|
| 3,258,422 A | 6/1966 | Ferry | |
| 3,481,152 A | 12/1969 | Seeley | |
| 3,721,108 A | 3/1973 | Kocher | |
| 3,958,429 A | 5/1976 | Kirsch | |
| 4,657,073 A * | 4/1987 | McClintock | F28F 9/0138 165/162 |
| 5,411,078 A * | 5/1995 | Ares | F24F 3/1405 165/113 |
| 5,584,190 A | 12/1996 | Cole | |
| 6,070,426 A * | 6/2000 | Sakashita | F25B 39/04 62/428 |
| 6,141,986 A * | 11/2000 | Koplin | F24F 5/0035 62/304 |
| 6,378,605 B1 | 4/2002 | Kutscher | |
| 6,381,980 B1 | 5/2002 | Pringle | |
| 6,966,196 B2 | 11/2005 | Matsuki | |
| 7,937,963 B1 | 5/2011 | Semmes | |
| 7,992,397 B2 | 8/2011 | Nemoto | |
| 9,057,288 B2 | 6/2015 | Pierson | |
| 2003/0150226 A1 | 8/2003 | Jensen | |
| 2003/0213253 A1 | 11/2003 | James | |
| 2011/0167864 A1 | 7/2011 | Gu | |
| 2015/0380784 A1 | 12/2015 | Bass | |
| 2018/0017294 A1 * | 1/2018 | Baker | F25B 37/00 |

FOREIGN PATENT DOCUMENTS

| | | |
|---|---|---|
| EP | 0389190 | 9/1990 |
| WO | 2015110215 | 7/2015 |

OTHER PUBLICATIONS

Guntner AG & CO.; "Air☐cooled condensers in ammonia refrigerating plants as an alternative to evaporative condensers"; 2008; pp. 15.

Guntner AG & CO.; "Influence of refrigerant subcooling on the refrigerating plant efficiency"; 2010; pp. 18.

HVAC-TALK; "Water spraying on condensor"; http://hvac-talk.com/vbb/showthread.php?79369-Water-spraying-on-condensor; Jun. 30, 2005; pp. 1-33.

HVAC-TALK; "Water mist help cooling my AC condensor unit"; http://hvac-talk.com/vbb/showthread.php?633362-Water-mist-help-cooling-my-AC-con denser-unit; Sep. 5, 2010; pp. 1-50.

PCT; App. No. PCT/US2017/042117; International Search Report and Written Opinion dated Oct. 25, 2017.

Reindl, D., "Industrial Refrigeration Systems: Floating Head Pressure Control For Peak Energy Performance"; Focus on Energy; 2012; pp. 1-26.

USPTO; U.S. Appl. No. 15/649,742; Notice of Allowance dated Jan. 27, 2020; (pp. 1-12).

USPTO; U.S. Appl. No. 15/649,742; Office Action dated Jan. 28, 2019; (pp. 1-11).

USPTO; U.S. Appl. No. 15/649,742; Office Action dated Jun. 10, 2019; (pp. 1-14).

USPTO; U.S. Appl. No. 15/649,742; Office Action dated Sep. 20, 2019; (pp. 1-17).

USPTO; U.S. Appl. No. 15/873,654; Notice of Allowance dated Aug. 6, 2019; (pp. 1-10).

USPTO; U.S. Appl. No. 16/689,574; Office Action dated Mar. 26, 2021; (pp. 1-7).

USPTO; U.S. Appl. No. 16/689,574; Notice of Allowance dated Sep. 7, 2021; (pp. 1-8).

\* cited by examiner

AIR-COOLED AMMONIA REFRIGERATION SYSTEMS AND METHODS

RELATED APPLICATION

This application is a continuation of U.S. patent application Ser. No. 15/649,742 filed on Jul. 14, 2017, now U.S. Pat. No. 10,670,307, which claims the benefit of U.S. Provisional Application No. 62/363,151 filed on Jul. 15, 2016, each of which are incorporated herein by reference in their entireties.

TECHNICAL FIELD

This invention relates generally to the use of an air-cooled condenser in an ammonia refrigeration system.

BACKGROUND

Various large-scale industrial refrigeration systems are known in the art. One approach to large-scale industrial refrigeration systems essentially comprises the use of an evaporative condenser in combination with ammonia (NH3) as a refrigerant. In such a system, the heat exchanger is continuously sprayed with water, which removes heat from the circulating vaporous ammonia in the heat exchanger to form liquid ammonia. Evaporative condensers require large amounts of water, which can be costly to source, especially in geographic areas that are arid or areas that may be suffering from drought. Additionally, the use of evaporative condensers can often result in large amounts of wastewater, which can be costly to treat and/or dispose of. Accordingly, it can be advantageous to improve refrigeration systems to reduce energy, water, and wastewater costs.

BRIEF DESCRIPTION OF THE DRAWINGS

Disclosed herein are embodiments of systems, apparatuses and methods pertaining to air-cooled ammonia refrigeration systems. This description includes drawings, wherein.

Figure 1:
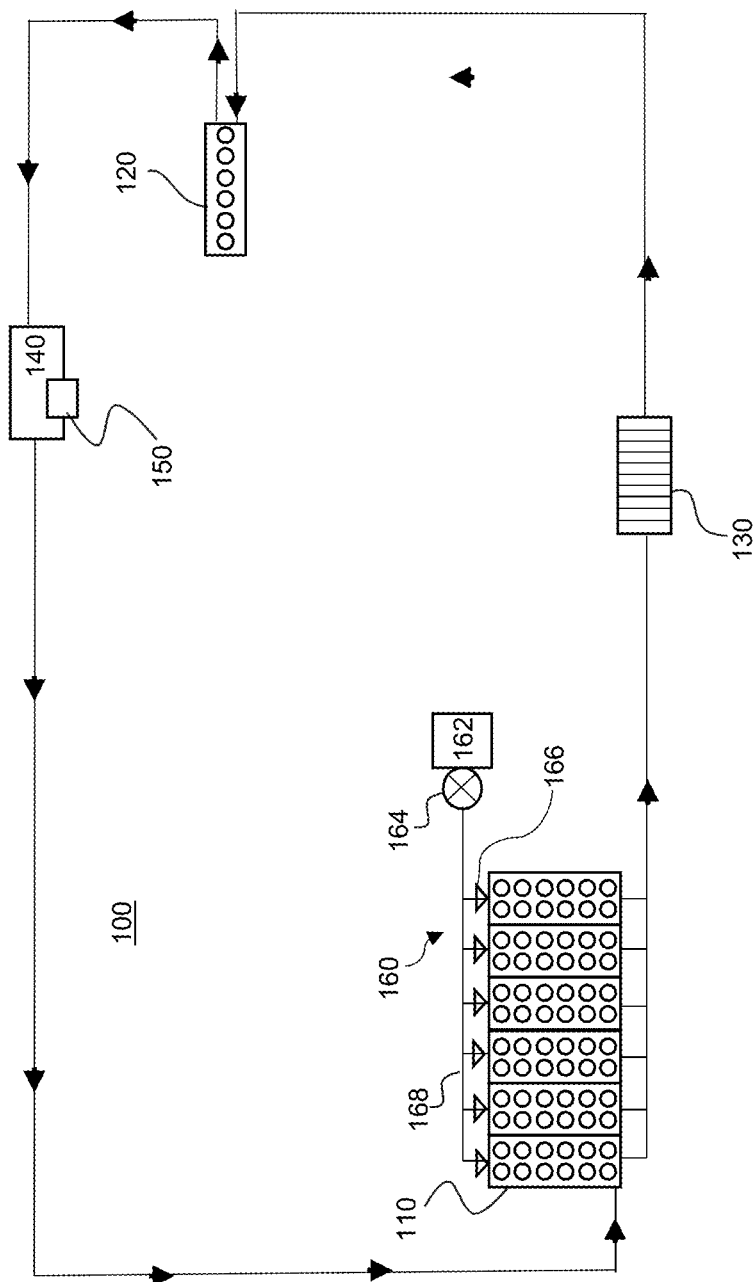
FIG. 1 illustrates a simplified block diagram of an exemplary air-cooled ammonia refrigeration system in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems, apparatuses and methods are provided herein for using an air-cooled condenser in an ammonia refrigeration system. The system includes an air-cooled condenser, which is sometimes referred to as a "waterless condenser" because it does not require the use of water to condense the refrigerant as is used in an evaporative condenser. The air-cooled condenser comprises a heat exchanger and at least one axial fan, the air-cooled condenser being configured to condense vaporous ammonia to form liquid ammonia. The system further includes an evaporator coupled to the air-cooled condenser and configured to evaporate liquid ammonia received from the air-cooled condenser to form vaporous ammonia, and a subcooler positioned between the air-cooled condenser and the evaporator, the subcooler being configured to remove heat from the liquid ammonia passing from the air-cooled condenser to the evaporator. A compressor is coupled to the evaporator and configured to compress the vaporous ammonia received from the evaporator, and an oil cooler coupled to the compressor and configured to remove heat from circulating oil in the compressor.

Although the air-cooled condenser used in the system described herein is generally referred to as a "waterless condenser," in some embodiments, the system may also include a water system coupled to the air-cooled condenser, the water system comprising a water source, a water pump, and a plurality of spray nozzles positioned below the air-cooled condenser. The water system may be used to control the head pressure of the air-cooled condenser via a control circuit coupled to the air-cooled condenser and the water system. With air-cooled condensers, highly variable ambient temperatures and/or large variations in the system load, can result in head pressures that are insufficient to ensure adequate flow of the refrigerant through the system. Accordingly, in the system described herein, the control circuit may pulse atomized water through the plurality of spray nozzles to a surface of the air-cooled condenser when a head pressure of the air-cooled condenser is higher than a predetermined value. Uniquely, the water system is configured to intermittently spray water to control the head pressure of the air-cooled condenser, and not in response to a detected temperature. In some embodiments, the control circuit pulses the atomized water such that the atomized water evaporates upon contact with the surface of the air-cooled condenser. In some embodiments, the atomized water may contain a water softening agent.

The system described herein surprisingly allows for the use of ammonia refrigeration in a configuration that increases efficiency and reduces operating costs compared to previous ammonia refrigeration systems. Previously, evaporative condensers were used in ammonia refrigeration systems. In a typical evaporative condenser refrigeration system, water is continuously sprayed over the condensing coil from above, which is usually made of galvanized steel, while air is simultaneously blown up through the coil from below to lower the condensing temperature. The amount of water used to spray the coils of an evaporative condenser is generally quite high, leading to high water costs and costs associated with wastewater treatment. Further, the water used in a typical evaporative condenser refrigeration system, which is often chemically treated, can cause corrosion and degradation of the galvanized steel used in typical evaporative condensers. As such, a typical evaporative condenser refrigeration system is expected to have a life span of only about 15 years.

The air-cooled ammonia refrigeration system described herein uses an air-cooled condenser, also known as a "waterless condenser," wherein minor amounts of water may be used to control head pressure, resulting in significantly reduced water costs and a higher life expectancy of the system. For example, in the air-cooled ammonia refrigeration system described herein, the air-cooled condensers are expected to last for about 30 years, or even longer. In addition, because the air-cooled ammonia refrigeration system described herein is configured to intermittently pulse atomized water to a surface of the air-cooled condenser such that the water evaporates upon contact with the coils, wastewater costs associated with cooling the coils can be eliminated. In some embodiments, the pulsed water may contain a water softening agent, which may prevent the spray nozzles from becoming clogged with mineral deposits.

In some embodiments, the heat exchanger may comprise a finned tube heat exchanger, which may, in some embodiments, have a tube diameter of at least about 0.5 inches and a fin density of at least about 12 fins per inch. This configuration allows for the reduction of temperature and/or pressure in the system compared to systems wherein the heat exchanger comprises tubes having a smaller diameter.

In some embodiments, the system may be configured such that the air-cooled condenser is elevated above a base surface, such as above a ground surface or a roof surface, to allow for increased air flow below the air-cooled condensers. For example, the system may include a plurality of legs configured to elevate the heat exchanger above various base surfaces. In some embodiments, the plurality of legs is configured to elevate the heat exchanger at least about 10 feet, and in some embodiments at least about 13 feet, above a roof surface. In some embodiments, the plurality of legs is configured to elevate the heat exchanger at least about 20 feet, and in some embodiments at least about 25 feet, above a ground surface. Elevating the air-cooled condenser as described above may reduce debris on the fin surface area, and may also improve air flow and minimize heat being pulled from surrounding ground or roof surface, allowing cooler air to be drawn across the heat exchanger.

In some embodiments, the system may further include a high pressure receiver coupled to the air-cooled condenser, and a recirculator coupled to the evaporator. In such a configuration, the high pressure receiver receives the liquid ammonia from the air-cooled condenser, and the recirculator receives the liquid ammonia from the high pressure receiver that has been cooled by the subcooler. In some embodiments, the high pressure receiver may also be coupled to the compressor such that the high pressure receiver provides liquid ammonia to cool the oil in the oil cooler that is coupled to the compressor.

As discussed above, previously, evaporative condensers were used in ammonia refrigeration systems. However, such systems require high amounts of continuous water to cool the evaporative condensers, which can be costly to source, especially in geographic areas that are arid or areas that may be suffering from drought. These previous systems also produce high amounts of wastewater, which can be costly to treat and/or to dispose of. The inventors of the present application designed a system whereby an air-cooled condenser can be used in combination with an ammonia refrigeration system, resulting in significant cost savings compared to previous ammonia refrigeration systems that used evaporative condensers. FIG. 1 provides simplified diagram of an exemplary air-cooled ammonia refrigeration system.

Figure 3:
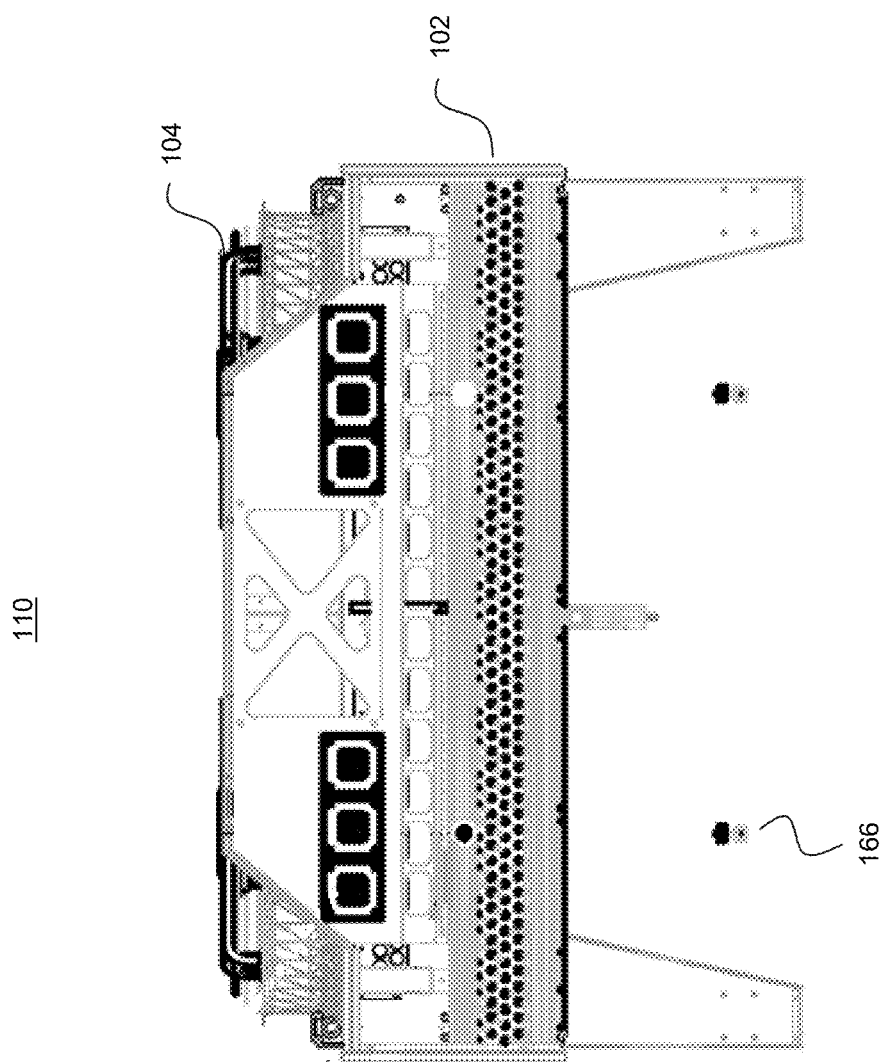
FIG. 3 illustrates a simplified diagram of an exemplary air-cooled condenser in accordance with some embodiments.
Figure 4:
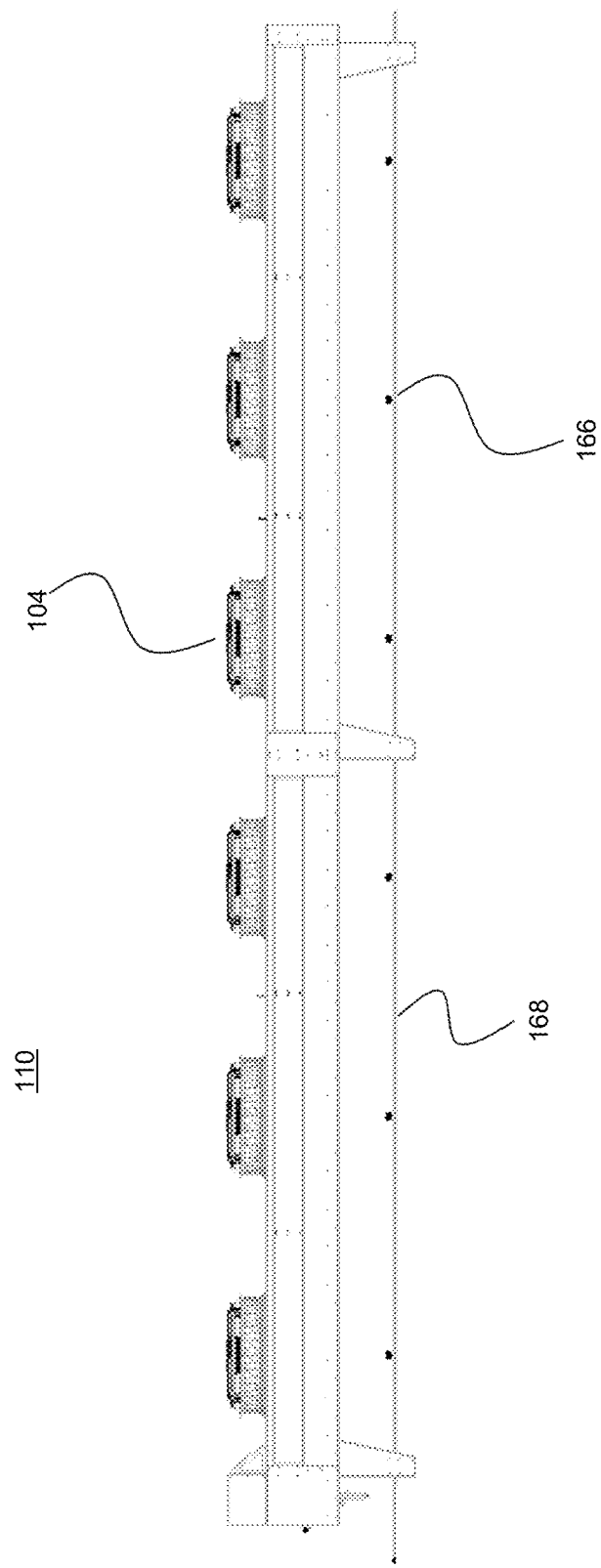
FIG. 4 illustrates a simplified diagram of an exemplary air-cooled condenser in accordance with some embodiments.

The system illustrated in FIG. 1 includes an air-cooled condenser 110 configured to condense vaporous ammonia to form liquid ammonia. Exemplary air-cooled condensers that may be used in the system described herein are illustrated in FIGS. 3 and 4. As shown in FIG. 3, the air-cooled condenser 110 includes a heat exchanger 102, which may comprise any suitable heat exchanger for use in an air-cooled condenser. In some embodiments, the heat exchanger 102 in the air-cooled condenser 110 may be a finned tube heat exchanger. The finned tube heat exchanger may be formed from any suitable material and may comprise any suitable dimensions for use in an air-cooled condenser. In some embodiments, the tubes of the heat exchanger may comprise stainless steel, while the fins of the heat exchanger may comprise aluminum. In some embodiments, the tubes of the finned tube heat exchanger may have a tube diameter of at least about 0.5 inches, which allows for the reduction of temperature and/or pressure in the system compared to systems wherein the heat exchanger comprises tubes having a smaller diameter. In some embodiments, the fins of the finned tube heat exchanger may have a fin density of at least about 12 fins per inch.

Figure 7:
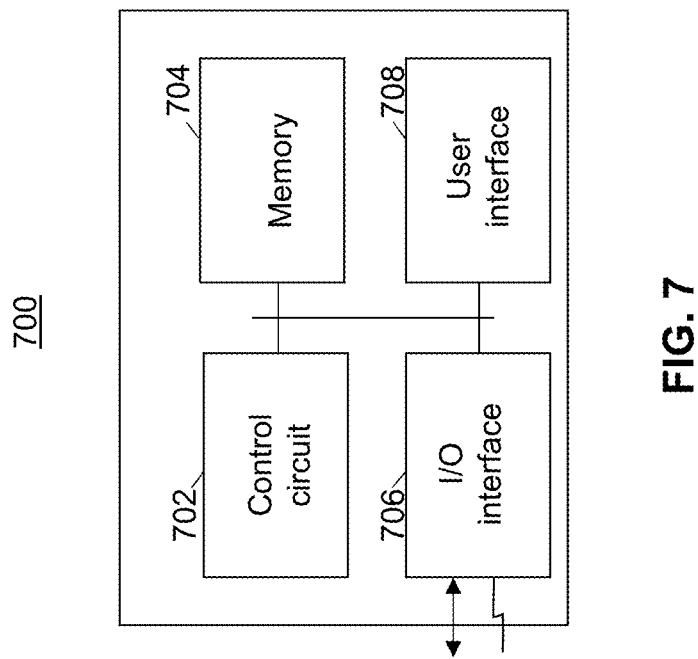
FIG. 7 illustrates an exemplary system for use in implementing systems, apparatuses, devices, methods, techniques and the like in using an air-cooled condenser in an ammonia refrigeration system in accordance with some embodiments.

The air-cooled condenser 110 includes at least one axial fan 104, which pulls cool air across the heat exchanger 102 to remove heat from the vaporous ammonia to form liquid ammonia. The air-cooled condenser 110 may include any suitable number of axial fans 104. In some embodiments, the air-cooled condenser may include up to, for example, 12 axial fans, or in some embodiments, even more. The one or more axial fans 104 may be controlled by a control circuit (an example of which is illustrated in FIG. 7 as control circuit 702) coupled to the one or more axial fans 104. Previously, variable-frequency drives (VFD), which may be controlled using a Programmable Logic Controller (PLC), have been used to control various components or systems, such as fan motors, in conventional refrigeration systems. However, such control systems can be inefficient due to their lack of precision and/or insensitivity to changing conditions. By contrast, the air-cooled ammonia refrigeration system described herein utilizes a control circuit to control the speed of the axial fan in response to one of more parameters. Such parameters may include, for example, temperature, pressure (including subcooling pressure), and the like.

Referring back to FIG. 1, the air-cooled condenser 110 is configured to flow vaporous ammonia through the heat exchanger 102, which condenses the vaporous ammonia to form liquid ammonia. The system further comprises an evaporator 120 coupled to the air-cooled condenser and configured to evaporate liquid ammonia received from the air-cooled condenser to form vaporous ammonia. A subcooler 130 is positioned between the air-cooled condenser 110 and the evaporator 120 and is configured to remove heat from the liquid ammonia passing from the air-cooled condenser 110 to the evaporator 120. The use of subcooler 130 to reduce the temperature of the liquid ammonia advantageously reduces the load on the system The system further includes a compressor 140 coupled to the evaporator 120 and is configured to compress the vaporous ammonia received from the evaporator 120. An oil cooler 150 is coupled to the compressor 140 and is configured to remove heat from circulating oil in the compressor 140. The oil cooler 150 used in the system described herein has a higher capacity than oil coolers used in conventional refrigeration systems. In some embodiments, the circulating oil in the compressor 140 may comprise fully synthetic oil. Conventional oil coolers are designed for use with evaporative condenser refrigeration systems, which generally have lower condensing temperature than air-cooled condensers. For example, conventional oil coolers that are used with evaporative condensers generally have a temperature limit of 95° F. The oil cooler 150 used in the air-cooled ammonia refrigeration system described herein may be configured to have a higher temperature limit, such as, for example, a temperature limit of at least 105° F. Such a configuration allows for the use of an air-cooled condenser, which generally runs hotter than evaporative condensers, in an ammonia refrigeration system without losing efficiency or shortening the life span of the compressor.

The system further includes a water system 160 coupled to the air-cooled condenser 110, the water system comprising a water source 162, a water pump 164, and a plurality of spray nozzles 166 positioned below the air-cooled condenser 110. An exemplary position of the spray nozzles 166 with respect to the air-cooled condenser 110 is shown in FIG. 3. In embodiments where the air-cooled condenser 110 comprises multiple axial fans 104, as illustrated in FIG. 4, a spray nozzle 166 may be positioned beneath each axial fan 104. The spray nozzles 166 may be coupled to one another via a spray bar 168 positioned below the air-cooled condenser.

A control circuit (an example of which is illustrated in FIG. 7 as control circuit 702) is coupled to the air-cooled condenser 110 and the water system 160 and is configured to pulse atomized water through the plurality of spray nozzles 166 to a surface of the air-cooled condenser 110 when a head pressure of the heat exchanger in the air-cooled condenser 110 is higher than a predetermined value. Notably, the control circuit is configured to spray the atomized water in response to a detected head pressure, rather than in response to a detected in the temperature of the system.

As discussed above, previously, variable-frequency drives (VFD), which may be controlled using a Programmable Logic Controller (PLC), have been used to control various components or systems, such as a water spay system, in conventional refrigeration systems. However, such control systems can be inefficient due to their lack of precision and/or insensitivity to changing conditions. The air-cooled ammonia refrigeration system described herein utilizes a control circuit to control the water system and its spray nozzles such that atomized water is intermittently pulsed through the spray when the control circuit determines that the head pressure of the heat exchanger 102 of the air-cooled condenser 110 is higher than a predetermined value. In some embodiments, the control circuit is configured to pulse the atomized water such that the atomized water evaporates upon contact with the surface of the air-cooled condenser 110 and no excess water is present on the ground or on surrounding surfaces. Since the system pulses atomized water only when the head pressure is high instead of continuously spraying water, and the atomized water evaporates upon contact with the surface of the heat exchanger, there is no wastewater to treat and/or dispose of By contrast, previous ammonia refrigeration systems use evaporative condensers, wherein the heat exchanger is continuously sprayed with water, resulting in high water and wastewater costs. As a result of using the air-cooled ammonia refrigeration system described herein, the inventors surprisingly found that water consumption can be reduced by about 90%, in some embodiments by about 95%, and in some embodiments by about 98%, over a 6 month period of use compared to previous systems.

As discussed above, previous ammonia refrigeration systems that use evaporative condensers are expected to last only about 15 years, due to corrosion of the heat exchanger, which is often made of steel coated with galvanized zinc. The air-cooled ammonia refrigeration system described herein is expected to last up to 30 years or more due, in part, to the significant reduction in water used, treating the water with a softening agent, and/or using stainless steel to form components of the air-cooled condenser. In some embodiments, the atomized water may contain a water softening agent, which may prevent the spray nozzles from becoming clogged with mineral deposits.

Figure 2:
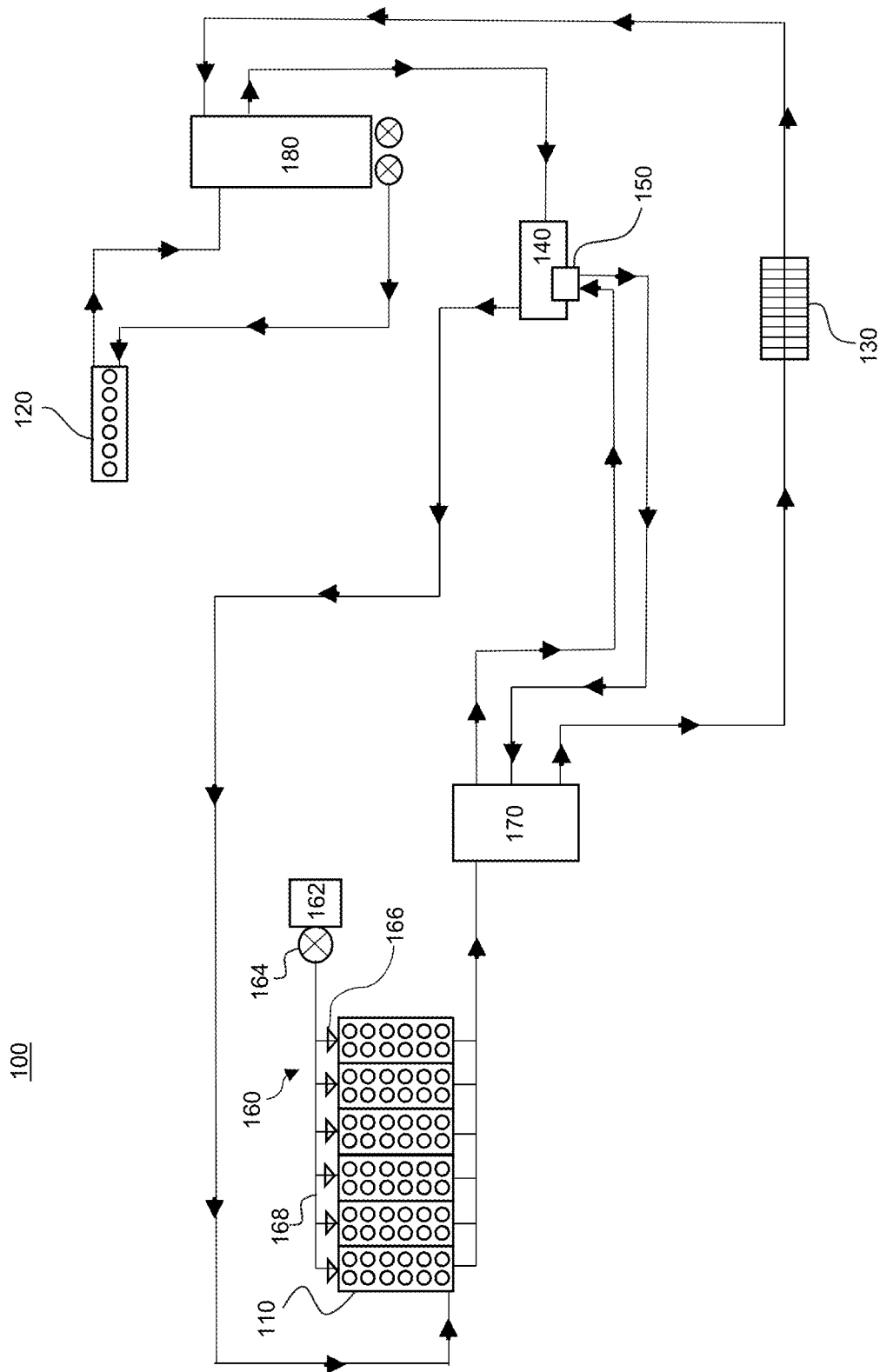
FIG. 2 illustrates a simplified block diagram of an exemplary air-cooled ammonia refrigeration system in accordance with some embodiments.

FIG. 2 illustrates an exemplary air-cooled ammonia refrigeration system that is similar to the system shown in FIG. 1. As in FIG. 1, the system shown in FIG. 2 includes an air-cooled condenser 110, an evaporator 120, a subcooler 130, a compressor 140, an oil cooler 150, and a water system 160. These components in FIG. 2 may comprise the respective components described above with reference to FIG. 1. The system may further include a high pressure receiver 170 coupled to the air-cooled condenser 110, and a recirculator 180 coupled to the evaporator 120. In such a configuration, the high pressure receiver 170 receives the liquid ammonia from the air-cooled condenser 110, and the recirculator 180 receives the liquid ammonia from the high pressure receiver 170 that has been cooled by the subcooler 130. In some embodiments, the high pressure receiver 170 may also be coupled to the compressor 140 such that the high pressure receiver provides liquid ammonia to cool the oil in the oil cooler 150 that is coupled to the compressor 140.

In some embodiments, the air-cooled refrigeration system described above with reference to FIGS. 1 and 2 may be configured or otherwise mounted in such a way so as to elevate one or more air-cooled condenser above a base surface, such as, for example, a ground surface or a roof surface. For example, in some embodiments, the system comprises a plurality of legs configured to elevate the heat exchanger(s) of the one or more air-cooled condensers at least about 10 feet from a base surface. Previously, air-cooled condensers were raised only a short distance from the base surface, such as, for example, about 3 feet from a ground surface. In such a configuration, the fans in the condenser may undesirable draw warm air from the surrounding ground over the heat exchanger, reducing the cooling efficiency of the condenser and increasing energy costs. Elevating air-cooled condensers above a base surface, in some embodiments at least about 10 feet above a base surface, may reduce debris on the fin surface area and may also improve air flow and minimize heat being pulled from surrounding base surface, allowing cooler air to be drawn across the heat exchanger.

Figure 5:
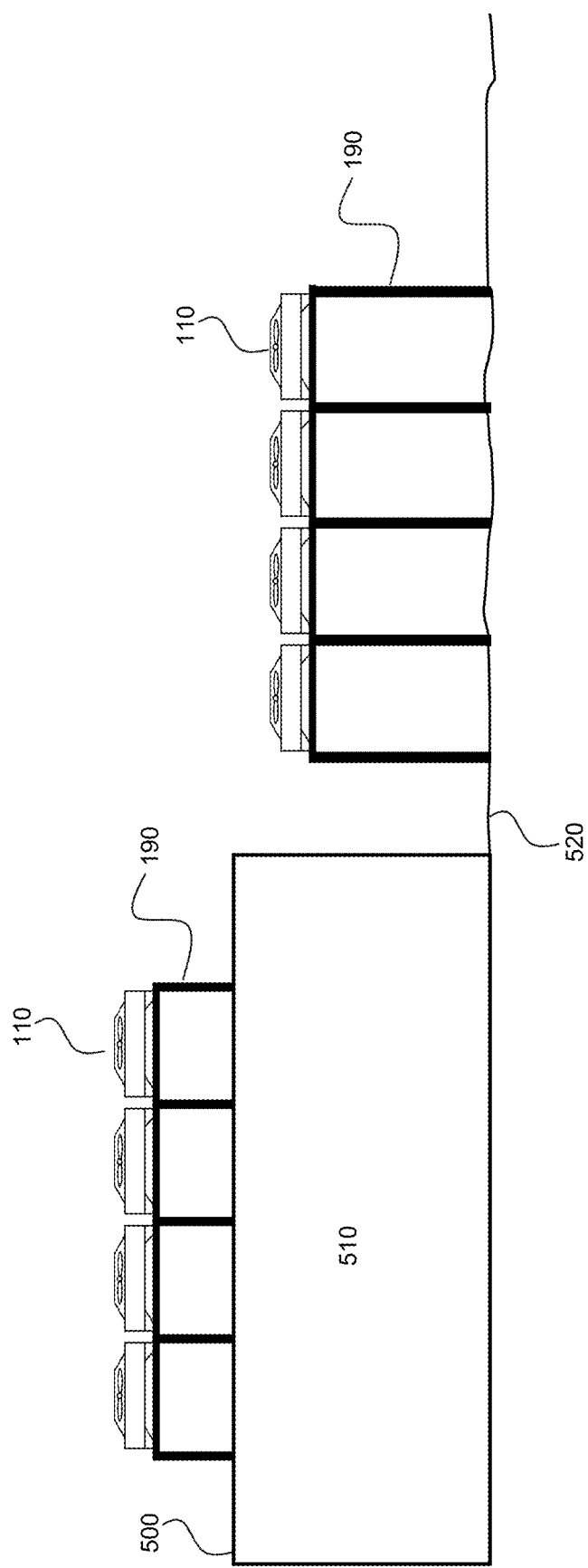
FIG. 5 illustrates a simplified diagram of exemplary elevated air-cooled condensers in accordance with some embodiments.

As illustrated in FIG. 5, the air-cooled refrigeration system described above with reference to FIGS. 1 and 2 may include a plurality of legs 190 configured to elevate one or more air-cooled condensers 110 above various surfaces. The air-cooled condensers 110 illustrated in FIG. 5 may comprise the air-cooled condensers 110 described above with reference to FIGS. 1-4. For example, one or more air-cooled condensers 110 may each comprise a heat exchanger and at least one axial fan, the air-cooled condensers being configured to condense vaporous ammonia to form liquid ammonia. In some embodiments, one or more air-cooled condensers 110 may be elevated above, for example, a roof surface 500. A roof surface may include the upper surface of any structure forming the upper covering of a building or dwelling 510, and may comprise any suitable roofing material(s). In some embodiments, the roof surface 500 may comprise a material that minimizes the possibility of warm air being drawn over the heat exchanger by the one or more axial fans of one or more air-cooled condensers 110. In some embodiments, the roof surface 500 itself may be at least about 25 feet, and in some embodiments at least about 30 feet, above a ground surface 520. When one or more air-cooled condensers 110 are mounted on a roof surface 500, a plurality of legs 190 may elevate the heat exchanger(s) of the one or more air-cooled condensers 110 at least about 10 feet, and in some embodiments at least about 13 feet, above the roof surface 500.

In some embodiments, as also shown in FIG. 5, one or more air-cooled condensers 110 may be elevated above, for example, a ground surface 520. A ground surface may include any solid surface of the earth, including any natural or synthetic material that generally conforms to the a solid surface of the earth, such as, but not limited to, one or more of soil, grass, pavement, gravel, stone, brick, turf, wood, mulch, synthetic ground covering, and the like. When one or more air-cooled condensers 110 are mounted on a ground surface 520, a plurality of legs 190 may elevate the heat exchanger(s) of the one or more air-cooled condensers 110 at least about 20 feet, and in some embodiments at least about 25 feet, above the ground surface 520.

It should be understood that although FIG. 5 illustrates multiple air-cooled condensers 110 being elevated above a roof surface 500 and a ground surface 520 by a plurality of legs 190, similar configurations may be employed using a single air-cooled condenser 110 that is individually elevated by a plurality of legs 190. Similarly, a plurality of air-cooled condensers 110 may be individually elevated by a plurality of legs 190.

Figure 6:
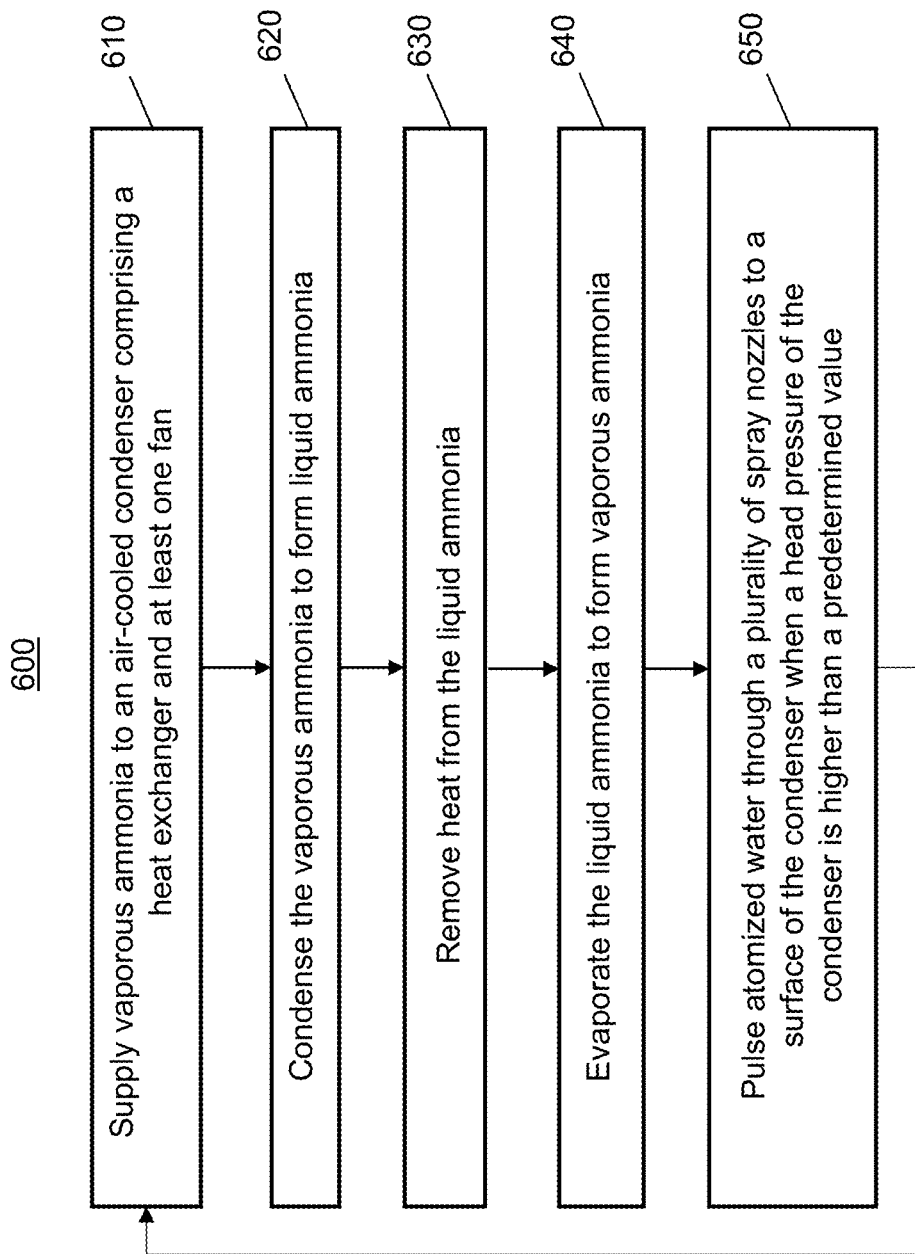
FIG. 6 illustrates a simplified flow diagram of an exemplary process of providing refrigeration using an air-cooled ammonia refrigeration system, in accordance with some embodiments.

Referring now to FIG. 6, a method of providing refrigeration using an air-cooled ammonia refrigeration system is shown. Generally, the method 600 shown in FIG. 6 may be implemented with a processor based device such as a control circuit, a central processor, and the like. In some embodiments, the method shown in FIG. 6 may be implemented by an air-cooled ammonia refrigeration system described above with reference to FIGS. 1 and 2.

In step 610, vaporous ammonia is supplied to an air-cooled condenser comprising a heat exchanger and at least one axial fan. In some embodiments, the air-cooled condenser, heat exchanger, and axial fan may comprise the air-cooled condenser 110, heat exchanger 102, and axial fan 104 described above with reference to FIGS. 1-4. The air-cooled condenser may include a heat exchanger, which may comprise any suitable heat exchanger for use in an air-cooled condenser. In some embodiments, the heat exchanger in the air-cooled condenser may be a finned tube heat exchanger. The finned tube heat exchanger may be formed from any suitable material and may comprise any suitable dimensions for use in an air-cooled condenser. In some embodiments, the tubes of the heat exchanger may comprise stainless steel, while the fins of the heat exchanger may comprise aluminum. In some embodiments, the tubes of the finned tube heat exchanger may have a tube diameter of at least about 0.5 inches, which allows for the reduction of temperature and/or pressure in the system compared to systems wherein the heat exchanger comprises tubes having a smaller diameter. In some embodiments, the fins of the finned tube heat exchanger may have a fin density of at least about 12 fins per inch.

The air-cooled condenser may include at least one axial fan, which pulls cool air across the heat exchanger to remove heat from the vaporous ammonia to form liquid ammonia. The air-cooled condenser may include any suitable number of axial fans. In some embodiments, the air-cooled condenser may include up to, for example, 12 axial fans, or in some embodiments, even more. The one or more axial fans may be controlled by a control circuit coupled to the one or more axial fans. The control circuit may automatically control the speed of the axial fan in response to one of more parameters. Such parameters may include, for example, temperature, pressure (subcooling pressure), and the like. The control circuit may comprise the control circuit 702 described below with reference to FIG. 7

In step 620, the vaporous ammonia is condensed to form liquid ammonia. The vaporous ammonia may condensed to form liquid ammonia using the air-cooled condenser described in step 610.

In step 630, heat is removed from the liquid ammonia. The heat may be removed from the liquid ammonia by passing the liquid ammonia through a subcooler, which may comprise the subcooler 130 described above with reference to FIGS. 1 and 2. The use of a subcooler to reduce the temperature of the liquid ammonia advantageously reduces the load on the system.

In step 640, the liquid ammonia is evaporated to form vaporous ammonia. The liquid ammonia may be evaporated to form vaporous ammonia by flowing the liquid ammonia to an evaporator, which may comprise the evaporator 120 described above with reference to FIGS. 1 and 2.

In step 650, atomized water is pulsed through a plurality of spray nozzles to a surface of the air-cooled condenser when a head pressure of the air-cooled condenser is higher than a predetermined value. In some embodiments, the atomized water may be pulsed using a water system comprising the water system described above with reference to FIGS. 1-4. For example, the water system may include a water source, a water pump, and a plurality of spray nozzles positioned below the air-cooled condenser. In embodiments where the air-cooled condenser comprises multiple axial fans, a spray nozzle may be positioned beneath each axial fan. The spray nozzles may be coupled to one another via a spray bar positioned below the condenser.

A control circuit (an example of which is illustrated in FIG. 7 as control circuit 702) may be coupled to the air-cooled condenser and the water system and may be configured to pulse atomized water through the plurality of spray nozzles to a surface of the air-cooled condenser when a head pressure of the heat exchanger in the air-cooled condenser is higher than a predetermined value. In some embodiments, the control circuit pulses the atomized water such that the atomized water evaporates upon contact with the surface of the air-cooled condenser and no excess water is present on the ground or on surrounding surfaces. Since the system pulses atomized water only when the head pressure is high instead of continuously spraying water, and the atomized water evaporates upon contact with the surface of the heat exchanger, there is no wastewater to treat and/or dispose of. By contrast, previous ammonia refrigeration systems use evaporative condensers, wherein the heat exchanger is continuously sprayed with water, resulting in high water and wastewater costs. As a result of using the air-cooled ammonia refrigeration system described herein, the inventors surprisingly found that water consumption can be reduced by about 90%, in some embodiments by about 95%, and in some embodiments by about 98%, over a 6 month period of use compared to previous systems.

As discussed above, previous ammonia refrigeration systems that use evaporative condensers are expected to last only about 15 years, due to corrosion of the heat exchanger, which is often made of steel coated with galvanized zinc. The air-cooled ammonia refrigeration system described herein is expected to last up to 30 years or more due, in part, to the significant reduction in water used, treating the water with a softening agent, and/or using stainless steel to form components of the air-cooled condenser. In some embodiments, the atomized water may contain a water softening agent, which may prevent the spray nozzles from becoming clogged with mineral deposits.

In some embodiments, the method may further comprise flowing the vaporous ammonia to a compressor and compressing the vaporous ammonia, and flowing the vaporous ammonia back to the air-cooled condenser. In some embodiments, the compressor may comprise the compressor 140 described above with reference to FIGS. 1 and 2.

The method may further comprise removing heat from circulating oil in the compressor. Heat may be removed from the circulating oil using, for example, an oil cooler coupled to the compressor. In some embodiments, the oil cooler may comprise the oil cooler 150 described above with reference to FIGS. 1 and 2, which has a higher capacity than oil coolers used in conventional refrigeration systems. In some embodiments, the circulating oil in the compressor may comprise fully synthetic oil. As discussed above, conventional oil coolers are designed for use with evaporative condenser refrigeration systems, which generally have lower condensing temperature than air-cooled condensers. For example, conventional oil coolers that are used with evaporative condensers generally have a temperature limit of 95° F. The oil cooler used in the air-cooled ammonia refrigeration system described herein may be configured to have a higher temperature limit, such as, for example, a temperature limit of at least 105° F. Such a configuration allows for the use of an air-cooled condenser, which generally runs hotter than evaporative condensers, in an ammonia refrigeration system without losing efficiency or shortening the life span of the compressor.

In some embodiments, the liquid ammonia may be flowed from the air-cooled condenser to a high pressure receiver, from the high pressure receiver to a recirculator via the subcooler, and from the recirculator to the evaporator. The high pressure receiver and the recirculator may comprise the high pressure receiver 170 and the recirculator 180 described above with reference to FIG. 2. In some embodiments, liquid ammonia may also be flowed from the high pressure receiver to the compressor to cool the oil in the oil cooler that is coupled to the compressor.

In some embodiments, one or more air-cooled condensers may be elevated at least about 10 feet above various base surfaces, such as, for example, a roof surface or a ground surface. A ground surface may include any solid surface of the earth, including any natural or synthetic material that generally conforms to the a solid surface of the earth, such as, but not limited to, one or more of soil, grass, pavement, gravel, stone, brick, turf, wood, mulch, synthetic ground covering, and the like. A roof surface may include the upper surface of any structure forming the upper covering of a building or dwelling, and may comprise any suitable roofing material(s). In some embodiments, the roof surface may comprise a material that minimizes the possibility of warm air being drawn over the heat exchanger by the one or more axial fans of one or more air-cooled condensers. In some embodiments, the roof surface itself may be at least about 25 feet, and in some embodiments at least about 30 feet, above a ground surface.

When one or more air-cooled condensers are mounted on a roof surface, a plurality of legs may elevate the heat exchanger(s) of the one or more air-cooled condensers at least about 10 feet, and in some embodiments at least about 13 feet, above the roof surface. When one or more air-cooled condensers are mounted on a ground surface, a plurality of legs may elevate the heat exchanger(s) of the one or more air-cooled condensers at least about 20 feet, and in some embodiments at least about 25 feet, above the ground surface 520.

The methods, techniques, systems, devices, services, servers, sources and the like described herein may be utilized, implemented and/or run on many different types of devices and/or systems. Referring to FIG. 7, there is illustrated an exemplary system 700 that may be used for any such implementations, in accordance with some embodiments. One or more components of the system 700 may be used to implement any system, apparatus or device mentioned above or below, or parts of such systems, apparatuses or devices, such as for example, the air-cooled condenser 110, the evaporator 120, the subcooler 130, the compressor 140, the oil cooler 150, the water system 160, the high pressure receiver 170, and the recirculator 180, as described above with reference to FIGS. 1-6.

By way of example, the system 700 may include one or more system control circuits 702, memory 704, and input/output (I/O) interfaces and/or devices 706. Some embodiments further include one or more user interfaces 708. The system control circuit 702 typically comprises one or more processors and/or microprocessors. The memory 704 stores the operational code or set of instructions that is executed by the system control circuit 702 and/or processor to implement the functionality one or more of the components listed above. In some embodiments, the memory 704 may also store some or all of particular data that may be needed to detect and/or evaluate parameters such as, for example, temperature, pressure (including subcooling pressure), and the like. Such data may be pre-stored in the memory, received from an external source, be determined, and/or communicated to the system.

It is understood that the system control circuit 702 and/or processor may be implemented as one or more processor devices as are well known in the art. Similarly, the memory 704 may be implemented as one or more memory devices as are well known in the art, such as one or more processor readable and/or computer readable media and can include volatile and/or nonvolatile media, such as RAM, ROM, EEPROM, flash memory and/or other memory technology. Further, the memory 704 is shown as internal to the system 700; however, the memory 704 can be internal, external or a combination of internal and external memory. Additionally, the system typically includes a power supply (not shown), which may be rechargeable, and/or it may receive power from an external source. While FIG. 7 illustrates the various components being coupled together via a bus, it is understood that the various components may actually be coupled to the system control circuit 702 and/or one or more other components directly.

Generally, the system control circuit 702 and/or electronic components of the system 700 can comprise fixed-purpose hard-wired platforms or can comprise a partially or wholly programmable platform. These architectural options are well known and understood in the art and require no further description here. The system and/or system control circuit 702 can be configured (for example, by using corresponding programming as will be well understood by those skilled in the art) to carry out one or more of the steps, actions, and/or functions described herein. In some implementations, the system control circuit 702 and the memory 704 may be integrated together, such as in a microcontroller, application specification integrated circuit, field programmable gate array or other such device, or may be separate devices coupled together.

The I/O interface 706 allows wired and/or wireless communication coupling of the system 700 to external components and/or or systems. Typically, the I/O interface 706 provides wired and/or wireless communication (e.g., Wi-Fi, Bluetooth, cellular, RF, and/or other such wireless communication), and may include any known wired and/or wireless interfacing device, circuit and/or connecting device, such as but not limited to one or more transmitter, receiver, transceiver, etc.

The user interface 708 may be used for user input and/or output display. For example, the user interface 708 may include any known input devices, such one or more buttons, knobs, selectors, switches, keys, touch input surfaces, audio input, and/or displays, etc. Additionally, the user interface 708 include one or more output display devices, such as lights, visual indicators, display screens, etc. to convey information to a user, such as but not limited to item container quantity information, predefined location information, modification information related to the modification and/or addition of predefined audio signatures, status information, notifications, errors, conditions, and/or other such information. Similarly, the user interface 708 in some embodiments may include audio systems that can receive audio commands or requests verbally issued by a user, and/or output audio content, alerts and the like.

In one embodiment, an air-cooled ammonia refrigeration system comprises: an air-cooled condenser comprising a heat exchanger and at least one axial fan, the air-cooled condenser configured to condense vaporous ammonia to form liquid ammonia; an evaporator coupled to the air-cooled condenser and configured to evaporate liquid ammonia received from the air-cooled condenser to form vaporous ammonia; a subcooler positioned between the air-cooled condenser and the evaporator and configured to remove heat from the liquid ammonia passing from the air-cooled condenser to the evaporator; a compressor coupled to the evaporator and configured to compress the vaporous ammonia received from the evaporator; an oil cooler coupled to the compressor and configured to remove heat from circulating oil in the compressor; a water system coupled to the air-cooled condenser, the water system comprising a water source, a water pump, and a plurality of spray nozzles positioned below the air-cooled condenser; and a control circuit coupled to the air-cooled condenser and the water system, the control circuit configured to pulse atomized water through the plurality of spray nozzles to a surface of the air-cooled condenser when a head pressure of the air-cooled condenser is higher than a predetermined value.

In one embodiment, method of providing refrigeration using air-cooled ammonia refrigeration system comprises: supplying vaporous ammonia to an air-cooled condenser comprising a heat exchanger and at least one axial fan; condensing the vaporous ammonia to form liquid ammonia; removing heat from the liquid ammonia; evaporating the liquid ammonia to form vaporous ammonia; and pulsing atomized water through a plurality of spray nozzles to a surface of the air-cooled condenser when a head pressure of the air-cooled condenser is higher than a predetermined value.

In one embodiment, an air-cooled ammonia refrigeration system comprises: an air-cooled condenser comprising a finned tube heat exchanger having a tube diameter of at least about 0.5 inches and a fin density of at least about 12 fins per inch, and at least one axial fan, the air-cooled condenser configured to condense vaporous ammonia to form liquid ammonia; an evaporator coupled to the air-cooled condenser and configured to evaporate liquid ammonia received from the air-cooled condenser to form vaporous ammonia; a subcooler positioned between the air-cooled condenser and the evaporator and configured to remove heat from the liquid ammonia passing from the air-cooled condenser to the evaporator; a compressor coupled to the evaporator and configured to compress the vaporous ammonia received from the evaporator; an oil cooler coupled to the compressor and configured to remove heat from circulating oil in the compressor; a water system coupled to the air-cooled condenser, the water system comprising a water source, a water pump, and a plurality of spray nozzles positioned below the air-cooled condenser; a control circuit coupled to the air-cooled condenser and the water system, the control circuit configured to pulse atomized water through the plurality of spray nozzles to a surface of the air-cooled condenser when a head pressure of the air-cooled condenser is higher than a predetermined value such that the atomized water evaporates upon contact with the surface of the air-cooled condenser; and a plurality of legs configured to elevate the heat exchanger at least about 13 feet above a roof surface or at least about 25 feet above a ground surface.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for controlling head pressure of an air-cooled condenser, the system comprising:
   an air-cooled condenser configured to condense vaporous ammonia to form liquid ammonia;
   a water system coupled to the air-cooled condenser, the water system comprising a water source, a water pump, and a plurality of spray nozzles; and
   a control circuit coupled to the air-cooled condenser and the water system, the control circuit configured to:

determine a head pressure of the air-cooled condenser; and when the head pressure of the air-cooled condenser is higher than a predetermined value, provide atomized water through the plurality of spray nozzles to a surface of the air-cooled condenser such that the water evaporates upon contact with the surface of the air-cooled condenser.

2. The system of claim 1, wherein none of the water provided to the surface of the air-cooled condenser accumulates as wastewater.

3. The system of claim 1, wherein the control circuit pulses the water through the plurality of spray nozzles to the surface of the air-cooled condenser.

4. The system of claim 1, wherein the air-cooled condenser comprises a finned tube heat exchanger and at least one fan.

5. The system of claim 4, wherein the finned tube heat exchanger has a tube diameter of at least about 0.5 inches and a fin density of at least about 12 fins per inch.

6. The system of claim 1, wherein a plurality of legs is configured to elevate the air-cooled condenser at least about 13 feet above a roof surface.

7. The system of claim 1, wherein a plurality of legs is configured to elevate the air-cooled condenser at least about 25 feet above a ground surface.

8. A method of controlling head pressure of an air-cooled condenser, the method comprising:

providing an air-cooled condenser configured to condense vaporous ammonia to form liquid ammonia;

providing a water system coupled to the air-cooled condenser, the water system comprising a water source, a water pump, and a plurality of spray nozzles;

determining, using a control circuit, a head pressure of the air-cooled condenser; and when the head pressure of the air-cooled condenser is higher than a predetermined value, providing, using the control circuit, atomized water through the plurality of spray nozzles to a surface of the air-cooled condenser such that the water evaporates upon contact with the surface of the air-cooled condenser.

9. The method of claim 8, wherein none of the water provided to the surface of the air-cooled condenser accumulates as wastewater.

10. The method of claim 8, wherein the water is pulsed through the plurality of spray nozzles to the surface of the air-cooled condenser.

11. The method of claim 8, wherein the air-cooled condenser comprises a finned tube heat exchanger and at least one fan.

12. The method of claim 11, wherein the finned tube heat exchanger has a tube diameter of at least about 0.5 inches and a fin density of at least about 12 fins per inch.

13. The method of claim 8, wherein a plurality of legs is configured to elevate the air-cooled condenser at least about 13 feet above a roof surface.

14. The method of claim 8, wherein a plurality of legs is configured to elevate the air-cooled condenser at least about 25 feet above a ground surface.

15. A system for controlling head pressure of an air-cooled condenser, the system comprising:

an air-cooled condenser comprising a finned tube heat exchanger and at least one fan, the air-cooled condenser configured to condense vaporous ammonia to form liquid ammonia;

a water system coupled to the air-cooled condenser, the water system comprising a water source, a water pump, and a plurality of spray nozzles positioned adjacent the air-cooled condenser; and a control circuit coupled to the air-cooled condenser and the water system, the control circuit configured to spray atomized water through the plurality of spray nozzles to a surface of the air-cooled condenser when a head pressure of the air-cooled condenser is higher than a predetermined value, wherein the water evaporates upon contact with the surface of the air-cooled condenser.

16. The system of claim 15, wherein none of the water provided to the surface of the air-cooled condenser accumulates as wastewater.

17. The system of claim 15, wherein the control circuit pulses the water through the plurality of spray nozzles to the surface of the air-cooled condenser.

18. The system of claim 15, wherein the finned tube heat exchanger has a tube diameter of at least about 0.5 inches and a fin density of at least about 12 fins per inch.

19. The system of claim 15, wherein a plurality of legs is configured to elevate the air-cooled condenser at least about 13 feet above a roof surface.

20. The system of claim 15, wherein a plurality of legs is configured to elevate the air-cooled condenser at least about 25 feet above a ground surface.

* * * * *